United States Patent
Yang et al.

(10) Patent No.: US 7,468,865 B2
(45) Date of Patent: Dec. 23, 2008

(54) SLIDER TOUCH-DOWN PREVENTING SYSTEM, HEAD STACK ASSEMBLY AND DISK DRIVE UNIT WITH THE SAME

(75) Inventors: Huai Yang, DongGuan (CN); HaiMing Zhou, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 315 days.

(21) Appl. No.: 11/125,086

(22) Filed: May 10, 2005

(65) Prior Publication Data
US 2006/0256477 A1 Nov. 16, 2006

(51) Int. Cl.
*G11B 5/48* (2006.01)
*G11B 21/16* (2006.01)
(52) U.S. Cl. .................. 360/244.2; 360/244.8
(58) Field of Classification Search ............. 360/244.5, 360/244.8, 245.2, 265.9, 244.2
See application file for complete search history.

(56) References Cited

U.S. PATENT DOCUMENTS 5,936,803 A * 8/1999 Berding .................. 360/244.8

| | | | | |
|---|---|---|---|---|
| 2002/0126419 A1* | 9/2002 | Kuwajima et al. | ....... | 360/265.7 |
| 2002/0145822 A1* | 10/2002 | Kuwajima et al. | ....... | 360/97.01 |
| 2004/0001287 A1* | 1/2004 | Honda et al. | ............. | 360/244.2 |
| 2004/0047077 A1* | 3/2004 | Honda et al. | ............. | 360/244.2 |
| 2004/0090710 A1* | 5/2004 | Honda et al. | ............. | 360/244.8 |
| 2004/0090711 A1* | 5/2004 | Kuwajima et al. | ....... | 360/244.8 |
| 2004/0246624 A1* | 12/2004 | Hashi et al. | ............. | 360/244.2 |

FOREIGN PATENT DOCUMENTS

| JP | 09082052 A | * | 3/1997 |
|---|---|---|---|
| JP | 11039808 A | * | 2/1999 |
| WO | WO 03105128 A2 | * | 12/2003 |

* cited by examiner

*Primary Examiner*—Craig A Renner
(74) *Attorney, Agent, or Firm*—Nixon & Vanderhye P.C.

(57) ABSTRACT

A slider touch-down preventing system for a head stack assembly, which includes a weight load to reduce the slider's movement; and a weight holder connecting with a suspension of the head stack assembly to hold the weight load. The weight holder is positioned at an opposite side of slider loading part of the suspension which has a structure to absorb vibration energy and is positioned beyond a middle portion of the suspension. The invention also discloses a HSA and a disk drive unit having such a slider touch-down preventing system.

10 Claims, 6 Drawing Sheets

SLIDER TOUCH-DOWN PREVENTING SYSTEM, HEAD STACK ASSEMBLY AND DISK DRIVE UNIT WITH THE SAME

FIELD OF THE INVENTION

The present invention relates to head stack assemblies (HSAs) and disk drive units, particularly to a slider touch-down preventing system for a head stack assembly so as to attain a good shock performance.

BACKGROUND OF THE INVENTION

Disk drives are information storage devices that use magnetic media to store data. A typical disk drive unit in related art comprises a magnetic disk and a head stack assembly (abbreviated as "HSA"). The magnetic disk is mounted on a spindle motor which causes the magnetic disk to spin. Sliders on the HSA are flying above the magnetic disk to read data from or write data to the magnetic disk.

The conventional HSA includes a rigid drive arm, at least one flexible suspensions which are fixed to a tip end of the drive arm, and sliders mounted to a top end section of each of the suspensions (the suspension with a slider is generally called a "HGA"). The HSA is constructed so that a load applied to the slider in a direction to the magnetic disk so as to produce a leaf spring at the suspension itself or at a connection section of the suspension and the drive arm.

Then, in the HSA with the conventional structure as described above, when an impact is applied thereto from outside, a balance of the suspension and the slider themselves is destroyed, there is a fear that the slider is strongly vibrated and collided against the magnetic disk surface, and causes a damage to the disk surface and/or the slider.

Hence, it is desired to provide a slider touch-down preventing system, a HSA and a disk drive unit with such a slider touch-down preventing system which has a better shock performance.

SUMMARY OF THE INVENTION

A main feature of the present invention is to provide a slider touch-down preventing system which can dynamically balance with a suspension and a slider (HGA) so as to prevent the slider thereon from strongly vibrating and colliding against magnetic disk surface.

Another feature of the present invention is to provide a HSA with at least one slider touch-down preventing systems so as to attain a good shock performance.

A further feature of the present invention is to provide a disk drive unit having at least one slider touch-down preventing systems.

To achieve the above-mentioned features, a slider touch-down preventing system for a HSA, which comprises a weight load to reduce the slider's movement; and a weight holder connecting with a suspension to hold the weight load; wherein the weight holder is positioned at an opposite side of a slider loading part of the suspension. In the present invention, the weight holder is positioned beyond a middle portion of the suspension. In an embodiment of the invention, the weight holder has a structure to absorb vibration energy. The weight load has a mass less than $L_2*m_2/L_1$; where $m_2$ is a total mass of the slider and the suspension, $L_1$ is a distance between a hinge portion of the suspension and the gravity center of the slider touch-down preventing system in a direction perpendicular to gravity direction, $L_2$ is a distance between the hinge portion and the mutual gravity center of the suspension and the slider in a direction perpendicular to gravity direction.

A HSA of the present invention comprises at least one head gimbal assembly; a drive arm to connect with the at least one head gimbal assembly; wherein each head gimbal assembly comprises a slider; a suspension connecting with the drive arm to load the slider; and at least one slider touch-down preventing system. Each slider touch-down preventing system comprises a weight load to reduce the slider's movement; and a weight holder connecting with the suspension to hold the weight load; wherein the weight holder is positioned at an opposite side of a slider loading part of the suspension. In the present invention, the weight holder is positioned beyond a middle portion of the suspension which has a structure to absorb vibration energy. The weight load has a mass less than $L_2*m_2/L_1$; where $m_2$ is a total mass of the slider and the suspension, $L_1$ is a distance between a hinge portion of the suspension and the gravity center of the slider touch-down preventing system in a direction perpendicular to gravity direction, $L_2$ is a distance between the hinge portion and the mutual gravity center of the suspension and the slider in a direction perpendicular to gravity direction.

A disk drive unit of the present invention comprises a HSA, a drive arm to connect with the head stack assembly; a disk; and a spindle motor to spin the disk; wherein the head stack assembly comprises at least one head gimbal assembly; a drive arm to connect with the at least one head gimbal assembly; wherein each head gimbal assembly comprises a slider; a suspension connecting with the drive arm to load the slider; and at least one slider touch-down preventing system; wherein each slider touch-down preventing system comprises a weight load to reduce the slider's movement; and a weight holder connecting with the suspension to hold the weight load; wherein the weight holder is positioned at an opposite side of slider loading part of the suspension. The weight holder is positioned beyond a middle portion of the suspension.

Compared with the prior art, because the HSA of the present invention has at least one slider touch-down preventing systems to reduce the movement of the slider by the weight load thereof, when an outside shock applied to the HSA or the disk drive unit, an additional torque generating from the HSA will be absorbed by the slider touch-down preventing system so as to prevent the slider thereon from strongly vibrating and colliding against magnetic disk surface, thus a good shock performance can be attained.

For the purpose of making the invention easier to understand, several particular embodiments thereof will now be described with reference to the appended drawings in which:

DETAILED DESCRIPTION OF THE INVENTION

As indicated above, the instant invention is to provide a slider touch-down preventing system to reduce the slider's movement, that prevents the slider on the suspension from strongly vibrating and colliding against magnetic disk surface when an impact acceleration applied to the HSA, thus a shock resistance performance can be attained therefrom. More important, the slider touch-down preventing system has a very simple structure and easier to manufacture and assemble. Several example embodiments of the slider touch-down preventing system and the HSA of the invention will now be described.

Figure 1:
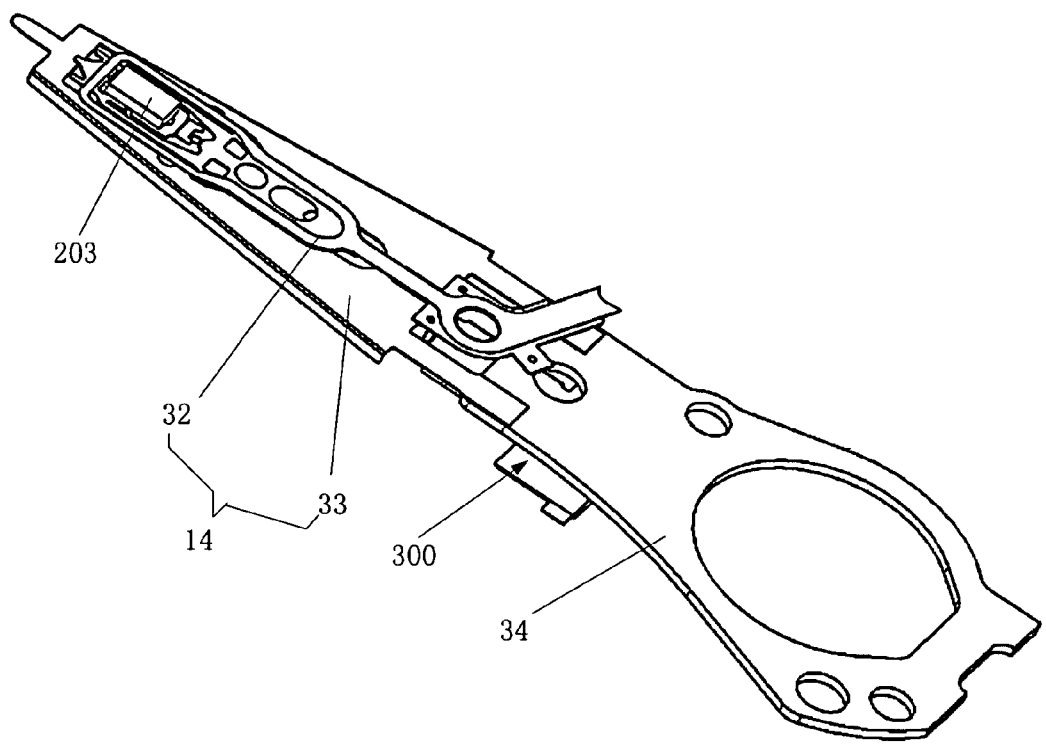
FIG. 1 is a perspective view of a HAA according to a first embodiment of the present invention.

Referring to FIG. 1, according to an embodiment of the present invention, a HAA 13 (a HSA with only one HGA) comprises a slider 203, a suspension 14 to load the slider 203, and a drive arm 34 to connect with the suspension 14 (the suspension 14 and the slider 203 constitute a HGA). In addition, a slider touch-down preventing system 300 is provided on the suspension 14 as an absorber for reducing the movement of the slider 203.

Figure 2:
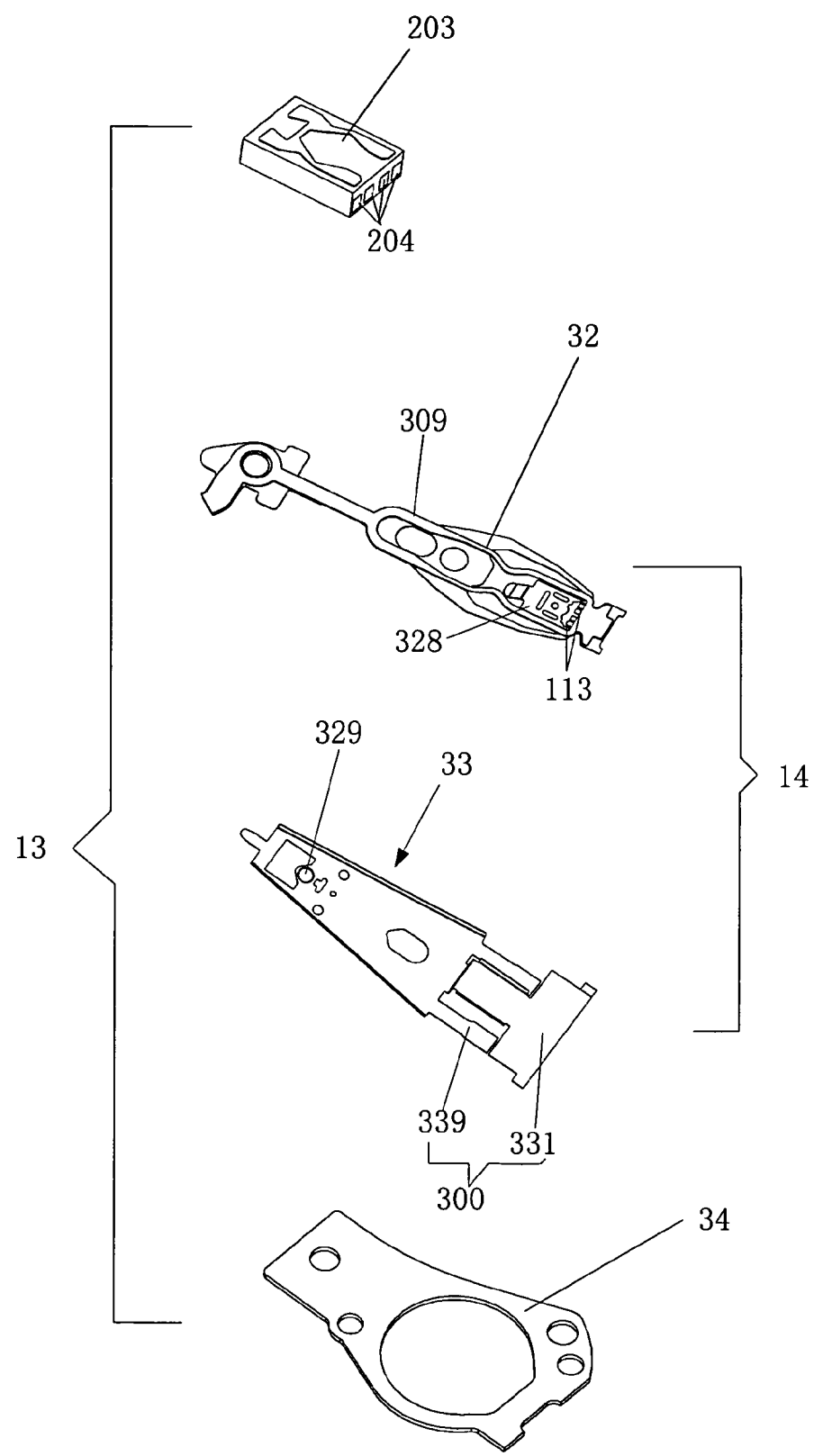
FIG. 2 is an exploded, perspective view of FIG. 1.
Figure 3:
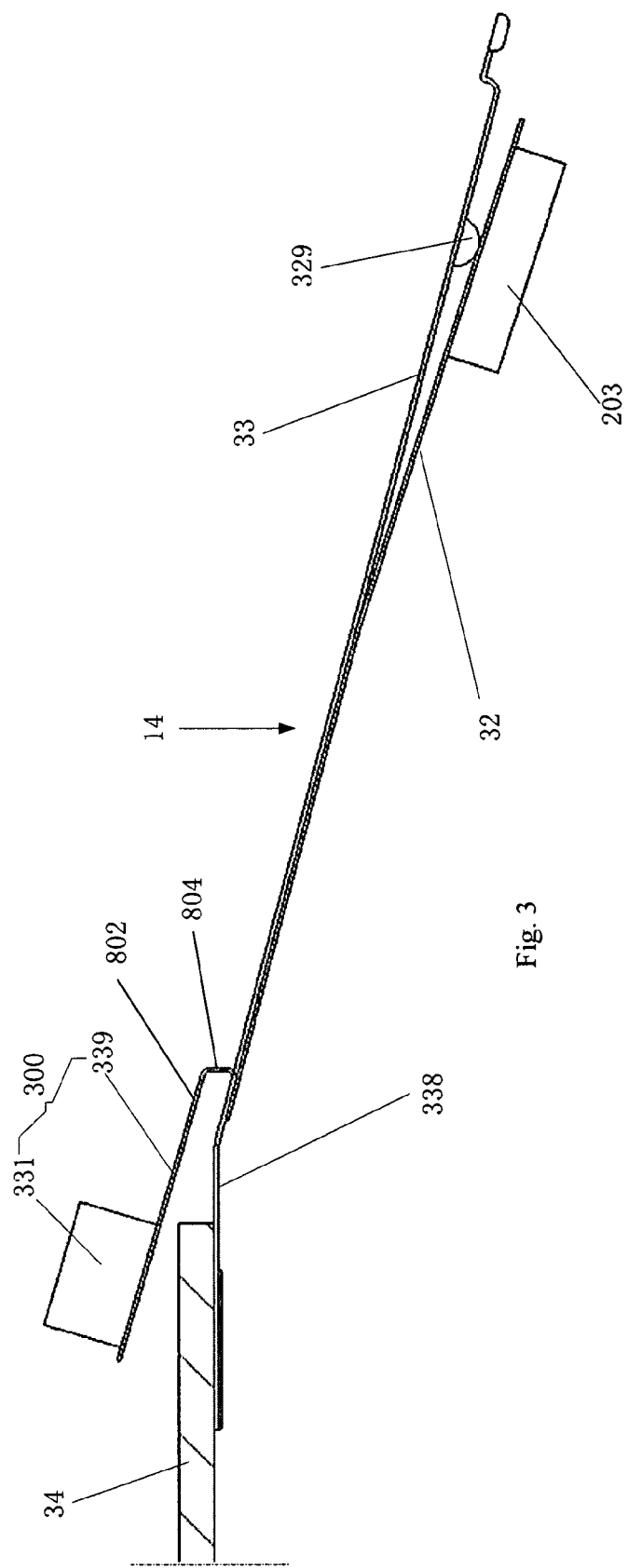
FIG. 3 is an enlarged, plane view to show a slider touch-down preventing system of the HAA of FIG. 1.

According to a first embodiment of the invention, referring to FIGS. 2-3, the suspension 14 comprises a load beam 33 and a flexure 32, which are connected with each other by traditional method, such as laser bonding or gluing. In the embodiment, the suspension 14 is coupled with the drive arm 34 by a hinge portion 338 extending from one end of the load beam 33. The slider touch-down preventing system 300 comprises a weight load 331, and a weight holder 339 to hold the weight load 331 in a predetermined position. In the present invention, the weight load 331 has a weight less than a whole weight of the suspension 14 and the slider 203. The weight holder 339 extends from the load beam 33 which is positioned at a position adjacent to the hinge portion 338. In the present invention, the weight holder 339 can be welded to the load beam 33, or formed together with the load beam 33 from one piece of material. The weight holder 339 is preferably made of a special material, such as damping material, so as to attain a structure to absorb vibration energy. The weight holder 339 comprises a buffer plate 804 extending from one surface of the suspension 14 opposite to the other surface against which the slider 203 may be attached; and a carry plate 802 which extends from a distal end of the buffer plate 804 along a direction away from the slider loading part of the suspension 14 and which carries the weight load 311 thereon, the buffer plate 804 and the carry plate 802 collectively defining an inverted L shape. The carry plate 802 is substantially parallel to and vertically spaced apart from a plane in which the suspension 14 is located.

Also referring to FIGS. 2-3, as an embodiment, the load beam 33 has a dimple 329 formed thereon. The flexure 32 comprises a suspension tongue 328 which are used to support the slider 203, and keep the loading force always being applied to the center area of the slider 203 through the dimples 329 of the load beam 33. The suspension tongue 328 has a plurality of electrical bonding pads 113 formed thereon. The slider 203 has a plurality of electrical bonding pads 204 on an end thereof corresponding to the electrical bonding pads 113 of the suspension tongue 328. The electrical bonding pads 204, 113 connect with each other by metal balls (GBB or SBB). A plurality of electrical multi-traces 309 is provided on the flexure 32 to connect the slider 203 with a control system (such as a PCBA, not shown).

In the invention, the flexure 32 is constructed to have elasticity to control a flying attitude of the slider 203. The drive arm 34 and the load beam 33 are both constructed from a plate member having sufficient rigidity, such as a stainless steel plate, or a resin plate member. The high rigidity of the drive arm 34 and the load beam 33 will enhance resistance against an impact or shock applied from outside. In addition, a resonance frequency can be also increased due to the drive arm 34 with high rigidity, thus making it possible to perform head position adjustment with high precision at a high speed without causing an unnecessary vibration mode.

Figure 4:
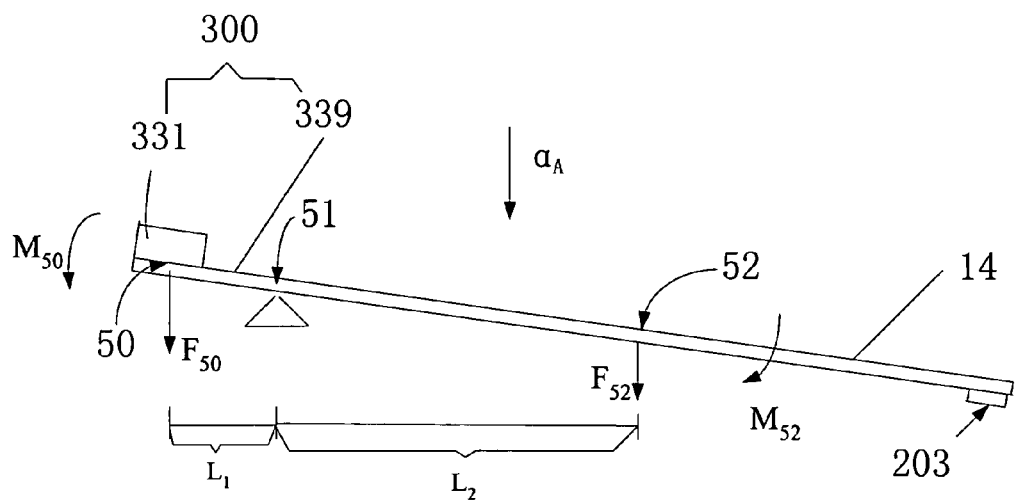
FIG. 4 is a schematic view illustrating a work principle of the slider touch-down preventing system of FIG. 3 in a first condition.
Figure 5:
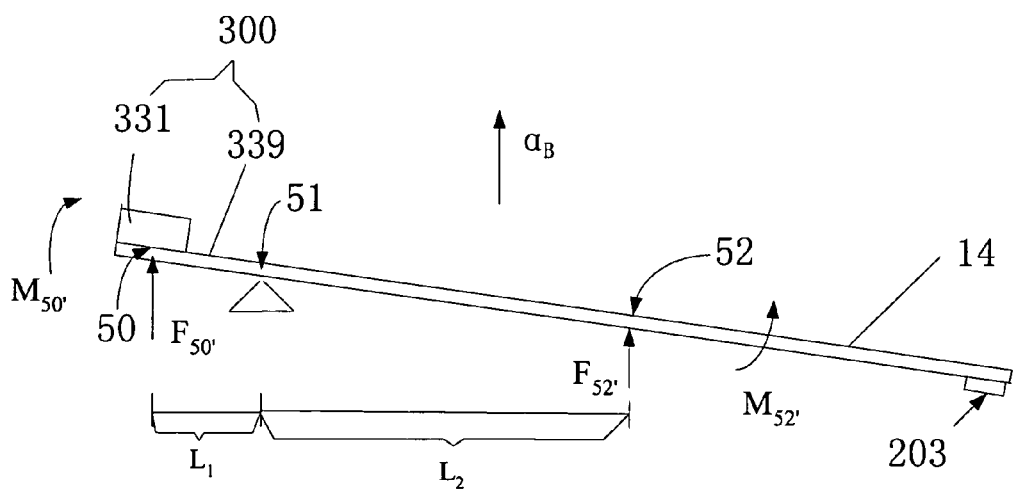
FIG. 5 is a schematic view illustrating a work principle of the slider touch-down preventing system of FIG. 3 in a second condition.

In an embodiment of the invention, referring to FIGS. 3-5, the position of the gravity center of the slider touch-down preventing system 300 is a position which substantially satisfies $L_1=L_2*m_2/m_1$; where $m_1$ is a mass of the slider touch-down preventing system 300, $m_2$ is a total mass of the slider 203, and the suspension 14, $L_1$ is a distance between the hinge portion 338 and the gravity center of the slider touch-down preventing system 300 in a direction parallel to the drive arm 34, $L_2$ is a distance between the hinge portion 338 and the mutual gravity center of the suspension 14 and the slider 203 in a direction parallel to the drive arm 34.

In order to easily understand the invention, the position of the gravity center will be explained using a model of the simple particle, as shown in FIG. 4, here, it is assumed that point 52 is a load application point exerted by the suspension 14 and the slider 203, point 50 is a gravity center of the slider touch-down preventing system 300, and point 51 is a load application point of the hinge portion 338. When the HAA 13 is applied a downward impact acceleration $\alpha_A$ due to an outside shock, such as a liner shock, and additional force $F_{52}$ is generated on the point 52 and accordingly a clockwise torque $M_{52}$ is applied to the slider 203 with the point 51 as a rotation center. Here the torque $M_{52}$ has a value of $m_2*L_2*\alpha_A$. In the present invention, because there is the slider touch-down preventing system 300 so that an additional force $F_{50}$ is produced and accordingly an anti-clockwise torque $M_{50}$ is applied to the slider 203 with the point 51 as a rotation center. Here the torque $M_{50}$ has a value of $m_1*L_1*\alpha_A$, because the gravity center of the slider touch-down preventing system 300 is a position which substantially satisfies $L_1=L_2*m_2/m_1$ so that $M_{50}$ and $M_{52}$ have a same value but converse directions to be applied to the slider 203 with the point 51 as a rotation center in balance. Thus, the slider 203 will be prevented from being strongly vibrated or collided against the magnetic disk surface due to no addition torque applied to the slider 203. Thus a good shock performance can be attained.

Similarly, referring to FIG. 5, when the HAA 13 is applied an upward impact acceleration $\alpha_B$ due to an outside linear shock, an additional force $F_{52'}$ is produced on the point 52 and accordingly an anti-clockwise torque $M_{52'}$ is applied to the slider 203 with the point 51 as a rotation center. Here the torque M52' has a value of $m_2*L_2*\alpha_B$. Also, because there is the slider touch-down preventing system 300 so that an additional force $F_{50'}$ is produced and accordingly a clockwise torque $M_{50'}$ is applied to the slider 203 with the point 51 as a rotation center. Obviously, $M_{50'}$ and $M_{52'}$ still have a same value but converse directions to be applied to the slider 203 with the point 51 as rotation center in balance. Thus, the slider 203 will prevent from being strongly vibrated or collided so as to attain a good shock performance, especially linear shock performance.

When $L_1=L_2*m_2/m_1$, the HAA 13 has a best liner shock performance. In some circumstances, the HAA 13 may need a shock performance with a good rotation shock performance. Then, $L_1$ can be reduced to a value between zero and $L_2*m_2/m_1$ so that an additional torque generating from the HAA 13 is absorbed, thus a better rotation shock performance can be attained.

Figure 6:
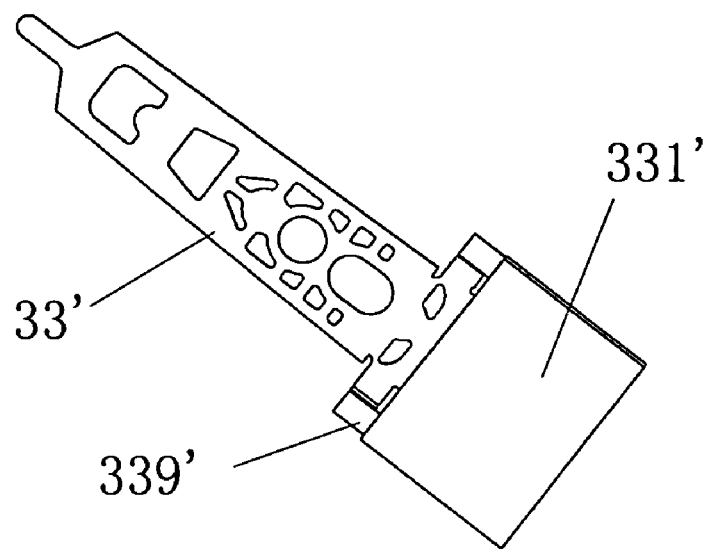
FIG. 6 is a perspective view to show another slider touch-down preventing system according to a second embodiment of the present invention.
Figure 7:
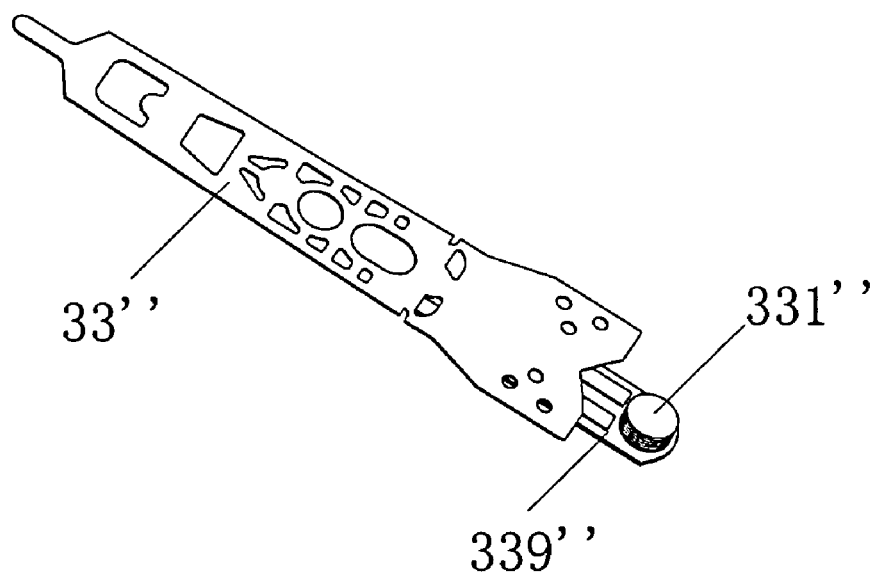
FIG. 7 is a perspective view to show a further slider touch-down preventing system according to a third embodiment of the present invention.
Figure 8:
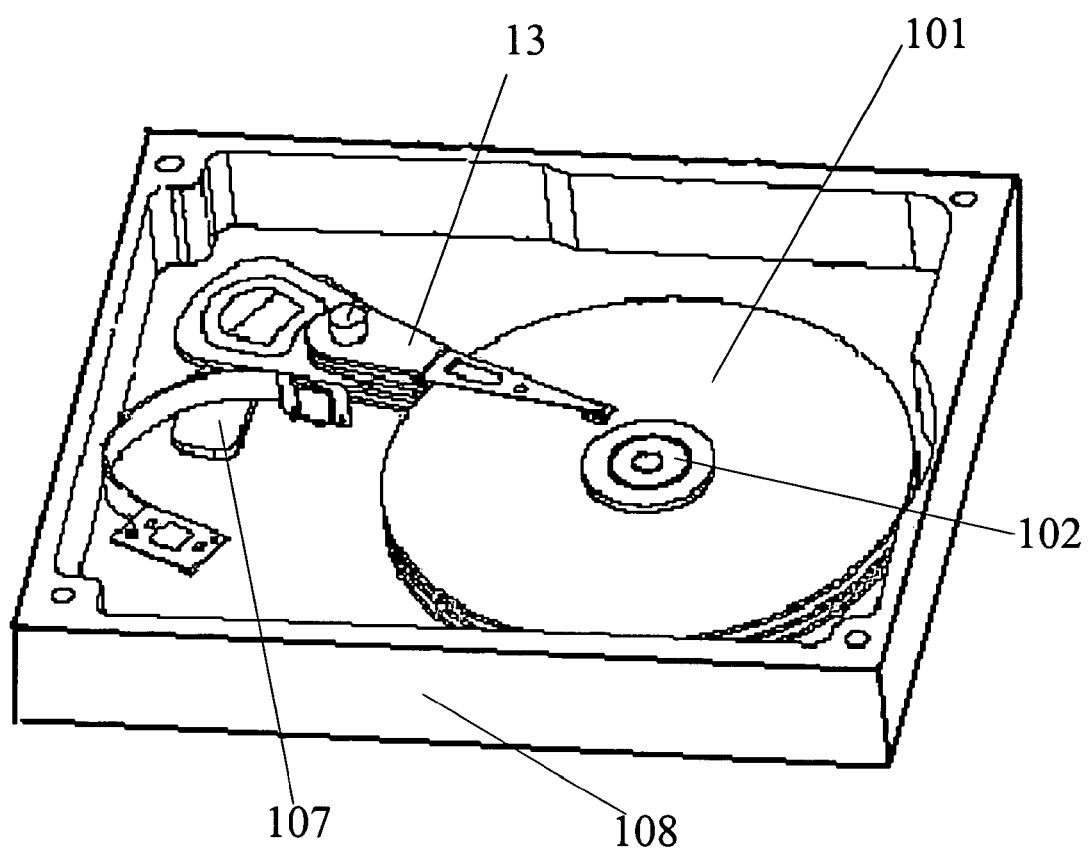
FIG. 8 is a perspective view of a disk drive unit with a slider touch-down preventing system according to an embodiment of the present invention.

Referring to FIG. 2, the weight load 331 is T-shaped and fixed to the weight holder 339. Referring to FIGS. 6-7, the weight load may be quadrate weight load 331' or cylinder-shaped weight load 331". The load beam and the weight holder can be the load beam 33', 33", and the weight holder 339', 339". Understandably, the shape of the weight load 331 and the assembly method of the slider touch-down preventing system 300 are not limited to the above-mentioned embodiments, any suitable shapes and assembly method can be applied to the slider touch-down preventing system of the invention to attain a same function.

Also, the HAA 13 is just an example to explain the work principle using the weight load 331, but the present invention is not limited only to the HAA like this, it is obvious the present invention is applicable to the HAA including a slider, such as one-piece HAA, or a HAA having a load beam, a hinge, a flexure and a base plate. In the invention, the slider touch-down preventing system 300 can be used to a HSA with more than one HGA. Each of the HGA has a slider touch-down preventing system 300 mounted thereon, thus the whole HSA can attain a good shock performance as the HAA 13. Understandably, the weight holder can be in any positions at an opposite side of a slider loading part of the suspension which is beyond a middle portion of the suspension according to certain requirement.

According to an embodiment of the invention, a disk drive unit 100 can be attained by assembling a disk 101, a spindle motor 102, the HAA 13, a VCM 107 and a disk drive housing 108. Because the structure and/or assembly process of such a disk drive unit 100 by using the HAA 13 of the present invention are well known to persons ordinarily skilled in the art, a detailed description of such structure and assembly is omitted herefrom.

What is claimed is:

1. A slider touch-down preventing system for a head stack assembly with a slider, comprising:
    a weight load to reduce the slider's movement; and
    a weight holder connecting with a suspension of the head stack assembly to hold the weight load,
    wherein the weight holder is positioned at an opposite side of a slider loading part of the suspension, and
    wherein the weight holder comprises a buffer plate extending from the suspension and a carry plate which extends from the buffer plate and which carries the weight load thereon, the carry plate being substantially parallel to and vertically spaced apart from a plane in which the suspension is located.

2. The slider touch-down preventing system as claimed in claim 1, wherein the weight holder is positioned beyond a middle portion of the suspension.

3. The slider touch-down preventing system as claimed in claim 1, wherein the weight holder has a structure to absorb vibration energy.

4. The slider touch-down preventing system as claimed in claim 1, wherein the weight load has a mass less than $L_2*m_2/L_1$; where $m_2$ is a total mass of the slider and the suspension, $L_1$ is a distance between a hinge portion of the suspension and the gravity center of the slider touch-down preventing system in a direction perpendicular to gravity direction, $L_2$ is a distance between the hinge portion and the mutual gravity center of the suspension and the slider in a direction perpendicular to gravity direction.

5. A head stack assembly comprising:
    at least one head gimbal assembly;
    a drive arm to connect with the at least one head gimbal assembly; wherein each said head gimbal assembly comprises:
    a slider;
    a suspension connecting with the drive arm to load the slider; and
    at least one slider touch-down preventing system;
    wherein each said slider touch-down preventing system comprises:
    a weight load to reduce the slider's movement; and
    a weight holder connecting with the suspension to hold the weight load;
    wherein the weight holder is positioned at an opposite side of a slider loading part of the suspension, and
    wherein the weight holder comprises a buffer plate extending from the suspension and a carry plate which extends from the buffer plate and which carries the weight load thereon, the carry plate being substantially parallel to and vertically spaced apart from a plane in which the suspension is located.

6. The head stack assembly as claimed in claim 5, wherein the weight holder is positioned beyond a middle portion of the suspension.

7. The head stack assembly as claimed in claim 5, wherein the weight holder has a structure to absorb vibration energy.

8. The head stack assembly as claimed in claim 5, wherein the weight load has a mass less than $L_2*m_2/L_1$; where $m_2$ is a total mass of the slider and the suspension, $L_1$ is a distance between a hinge portion of the suspension and the gravity center of the slider touch-down preventing system in a direction perpendicular to gravity direction, $L_2$ is a distance between the hinge portion and the mutual gravity center of the suspension and the slider in a direction perpendicular to gravity direction.

9. A disk drive unit comprising:
    a head stack assembly;
    a first drive arm to connect with the head stack assembly;
    a disk; and
    a spindle motor to spin the disk;
    wherein the head stack assembly comprises:
    at least one head gimbal assembly;
    a second drive arm to connect with the at least one head gimbal assembly;
    wherein each said head gimbal assembly comprises:
    a slider;
    a suspension to load the slider, the suspension connecting with the second drive arm of the at least one head gimbal assembly; and
    at least one slider touch-down preventing system,
    wherein each said slider touch-down preventing system comprises:
    a weight load to reduce the slider's movement; and
    a weight holder connecting with the suspension to hold the weight load,
    wherein the weight holder is positioned at an opposite side of a slider loading part of the suspension, and
    wherein the weight holder comprises a buffer plate extending from the suspension and a carry plate which extends from the buffer plate and which carries the weight load thereon, the carry plate being substantially parallel to and vertically spaced apart from a plane in which the suspension is located.

10. The disk drive unit as claimed in claim 9, wherein the weight holder is positioned beyond a middle portion of the suspension.

* * * * *